United States Patent Office 3,143,337
Patented Aug. 4, 1964

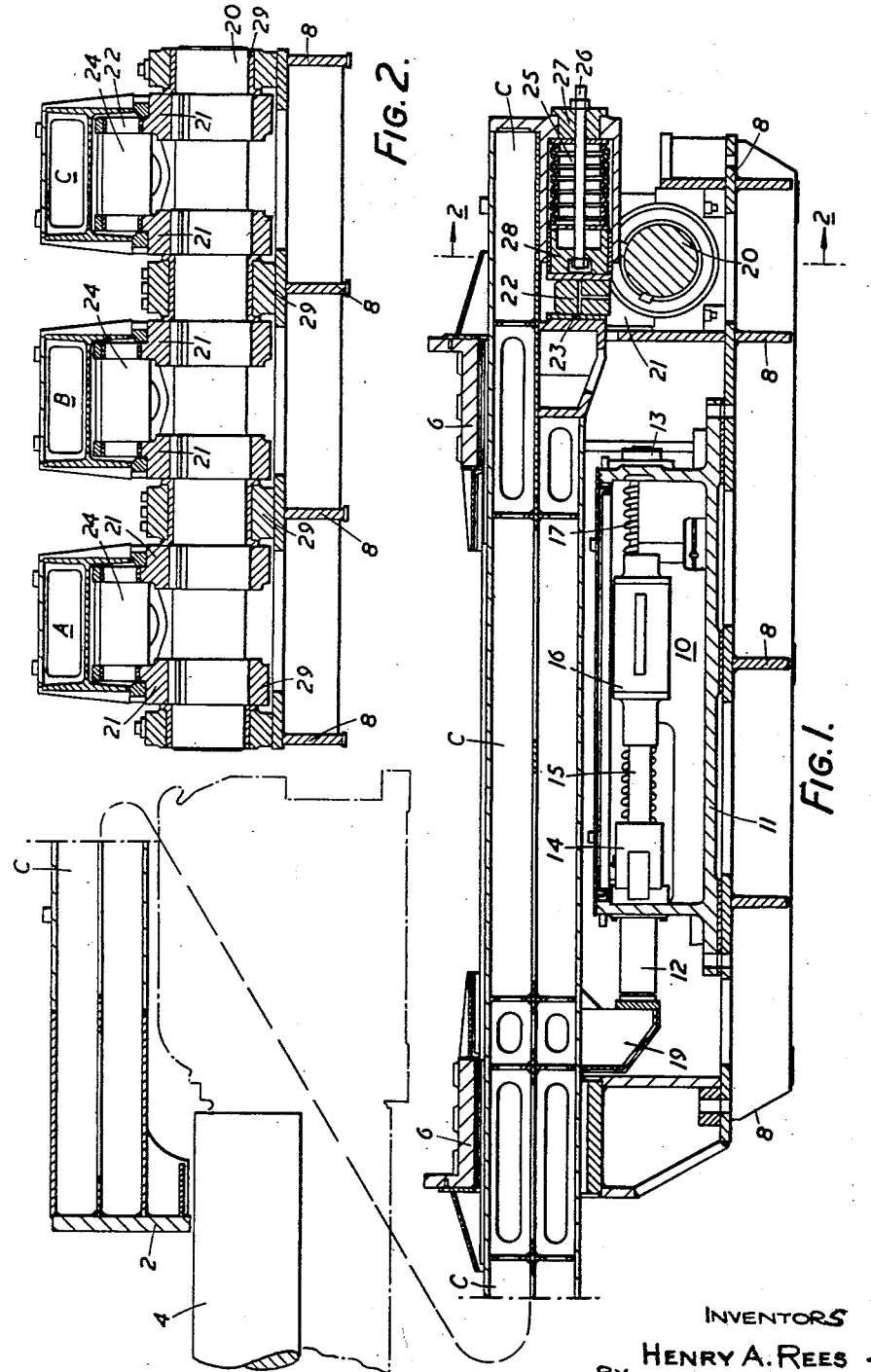

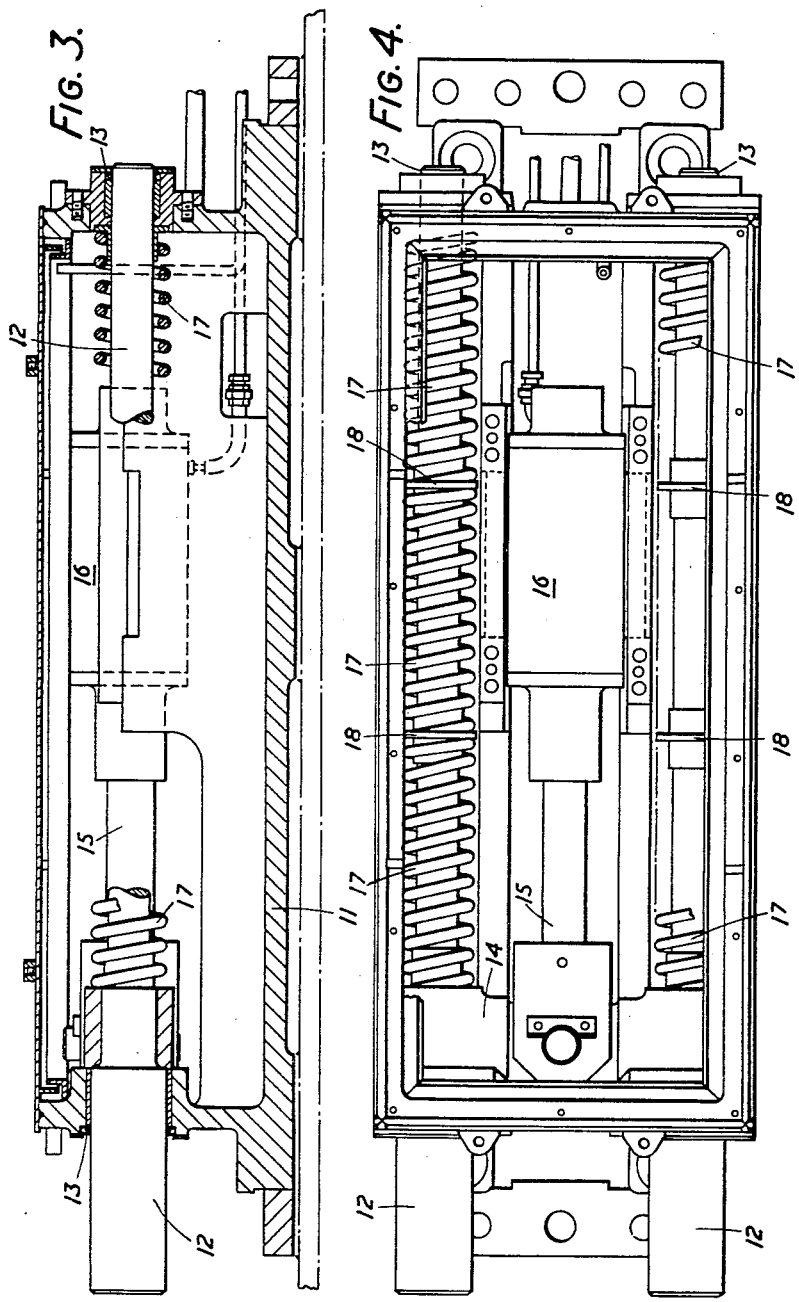

3,143,337
BUMPERS
Henry Andrew Rees and Tom Alexander George Shimeld, Sheffield, England, assignors to Davy and United Engineering Company Limited, Darnall Works, Sheffield, England
Filed Apr. 27, 1961, Ser. No. 106,133
Claims priority, application Great Britain Apr. 28, 1960
10 Claims. (Cl. 267—1)

This invention relates to bumpers and in particular to bumpers for use in plate mills to arrest the motion of slabs discharged from furnace chutes.

Previously, bumpers have been made with a single bumper head or beam having considerable width so as to arrest slabs arriving in different directions. Because of the great width of the bumper head and the need for rigidity in the head, a substantial strengthening structure was provided, with the result that the head structure was massive, having a weight of the order of 25 tons. The massive nature of the head in turn caused the head to be subject to large shock energies on being struck by slabs, so that breakage and repair were frequent.

According to the invention a bumper comprises a plurality of side-by-side bumper sections each having an individually operable, shock absorbing means and means linking the various shock absorbing means for joint operation whereby the shock of impact with one of said bumper sections acts upon all the shock absorbing means in common.

By providing a number of bumper sections, in place of the single bumper head of the previous constructions, the strengthening structure may be reduced so that the overall weight of the bumper is less than previously. Also, by using all the shock absorbing means of the bumper sections, regardless of the section struck by a slab, the shock absorbing means may be kept relatively simple and inexpensive, a single shock absorber capable alone of absorbing the shock energy applied to one of the bumper sections is liable to cost over twenty times as much as one of the shock absorbing means that may be employed when the various shock absorbing means are used in common.

The various features and advantages of the invention will be apparent from the following description of an exemplary embodiment thereof taken in conjunction with the drawings accompanying the provisional specification, in which:

FIGURE 1 is a sectional view taken lengthwise through one of the bumper sections of a bumper in accordance with the invention, FIGURE 2 is a sectional view of part of the bumper taken in a plane at right angles to that of FIGURE 1 along line 2—2 of FIGURE 1, FIGURE 3 is a sectional view of the shock absorbing unit of FIGURE 1 on an enlarged scale, and FIGURE 4 is a plan view of the unit of FIGURE 3 with the cover removed.

The bumper comprises a number of bumper sections, for example six, each including a beam, of which three are indicated at A, B and C in FIGURE 2, the beams being arranged in spaced parallel side-by-side relation and having at their forward or impact receiving ends enlarged bumper heads 2 which together form a substantially continuous bumper surface. The heads 2 are arranged above the roller surface of a receiving table indicated schematically at 4 on which a slab discharged from a furnace chute is received.

Each beam, such as the beam C of FIGURE 1, is mounted for longitudinal sliding movement in two bearings 6 arranged at the forward end and towards the rearward end of a support structure 8. Each beam has two downwardly extending shoulders 19 and 23 in the regions where the beam passes through the bearings 6.

Beneath each beam and extending between the two bearings 6 of each beam is an individual shock absorbing unit 10 of the hydraulic dash-pot type housed in a casing 11 having oil seals 13 at its forward and rearward ends. A pair of operating shafts 12 of each unit projects through a forward seal 13 to be abutted by a forwardly disposed shoulder 19 of the corresponding beam. Inside casing 11, the two shafts 12 are linked by a cross member 14 disposed at the forward end of the casing and arranged to displace a piston rod 15 in a cylinder 16 of the shock absorber unit. The shafts 12 pass on opposite sides of the piston and cylinder 15, 16 to extend through the seals 13 at the rearward end of casing 11. Between the forward and rearward ends of casing 11, each shaft 12 carries a set of three restoring springs 17 separated by washers 18 which are slidable on shafts 12. The springs 17 serve to urge the shafts 12 forwardly with a predetermined pre-loading force of, for example, one and a half tons.

Upon a discharged slab striking the bumper surface one or more of the beam heads 2 will receive the impact shock which is initially absorbed by the shock absorber unit 10 and spring assembly 17 of the bumper sections impacted by the slab, as the beams of these sections move rearwardly due to the shoulders 19 driving the shafts 12, cross member 14 and piston rod 15 in a rearward direction.

The movement of the beam or beams of the section or sections struck by the slab also causes the rearward shoulder 23 of such beam or beams to load a recoil device 24 of each of the remaining bumper sections which as will be explained, are linked for joint operation so that the loading on one of them is applied to them all and movement of one or more beams is thus opposed by the whole opposing force of the recoil devices of the remaining beams of the bumper assembly.

These recoil devices 24 form part of each bumper section and are mounted at the rearward end of each beam for movement with the beams and each comprises an assembly of ring springs 25 mounted on a rod 26 one end of which is slidably received in a bushing 27 at the rearward end of a beam and the other end of which is secured to an abutment in the form of a cap 28 which is spaced from the confronting face of the rearward shoulder 23 of the beam.

Beneath the devices 24 an equalising or coupling shaft 20 is mounted in sets of bearings 29 mounted on the support structure 8. On opposite sides of each beam a pair of crank arms 21 is keyed to the shaft 20, the arms 21 at their outer ends being linked in pairs by cross pieces 22 which fit into the spacing between the caps 28 and the confronting shoulders 23. In order to provide a degree of pre-loading of the spring assemblies of devices 24 the gaps between confronting faces of caps 28 and shoulders 23 in the absence of cross pieces 22 is arranged to be somewhat less than the corresponding dimension of the cross pieces 22 so that when the latter are forced into the gaps the caps are forced rearwardly to preload the springs 25.

The movement of a beam in response to being struck by a slab acts upon the cross piece 22 at the rear of that beam and displaces the pair of crank arms 21 on either side of the beam to rotate the shaft 20. Rotation of shaft 20 presses each of the other cross pieces 22 against their corresponding caps 28 and thus loads all of the recoil devices of the remaining beams. Thus the movement of one beam is opposed by the shock absorbing unit and spring assembly 17 of that beam and also the recoil devices of all the remaining beams. If the force causing movement of the beam is greater than can be arrested by this extent of opposition the continued movement of the one beam and thus the continued rotary movement of shaft 20 beings to draw all the remaining beams rearwardly against the opposition of their individual shock absorbing units 11 and spring assemblies 17. The force is thus opposed by the whole opposing force of the bumper assembly except for that of the recoil device 24 of the beam struck by the slab.

Upon removal of the impact force the recoil devices 24 and the shock absorber units 10 of the various beams urge the beams to return to their original positions and return the equalising shaft to its original position.

In accordance with the provisions of the patent statutes, we have explained the principles and operation of our invention and have illustrated and described what we consider to represent the best embodiment thereof. However, we desire to have it understood that within the scope of the appended claims, the invention may be practiced otherwise than as specifically illustrated and described.

We claim:

1. A bumper comprising a plurality of individual bumper sections, each bumper section having an individual bumper head arranged on one side of said section and side-by-side with a bumper head of adjacent sections for absorbing the force caused by an engaging workpiece, each bumper section having an individually operable shock absorbing means and an individual operable recoil means remotely arranged from said head thereof, means for transferring shock imposed on one of said bumper sections to its shock absorbing means and recoil means, and means displaceable by said bumper section and associated with said recoil means and said shock absorbing means of said other bumper sections, whereby shock imposed on a bumper section will be absorbed jointly by the shock absorbing means thereof and the recoil and shock absorbing means of the other sections.

2. A bumper as claimed in claim 1 in which each bumper section comprises a beam supported for individual longitudinal sliding movement in response to impact forces applied to one end thereof, the impact receiving ends of the bumper sections together forming a substantially continuous bumper surface, in their normal position when no force is applied.

3. A bumper comprising a plurality of side-by-side bumper sections, an individually operable shock absorbing means and an indivdual recoil means connected to each of said bumper sections, an equalizing shaft and individual members, one associated with each section, carried by the shaft to oscillate with the shaft, each of said members being operatively connected to said bumper section and its associated recoil means; the equalizing shaft being arranged to be displaced in rotation by movement of any one of said bumper sections in response to impact forces acting upon any one of said sections and thereby to oscillate the members to load the individual recoil means of the remaining bumper sections, whereby impact forces acting on one of said sections are initially opposed by the shock absorbing means of such section or sections and the recoil means of the remaining sections and then by the shock absorbing means of said remaining sections.

4. A bumper as claimed in claim 3 in which each said recoil means is arranged to act between said member carried by said shaft and its associated bumper section so as to oppose turning movement of said shaft up to the loading limit of said recoil means and thereafter to transmit further movement of the shaft to its associated bumper section to move such section against the opposition of its shock absorbing means.

5. A bumper as claimed in claim 4 in which each bumper section carries two abutment members respectively arranged to engage the actuating member of its associated shock absorbing means and said member carried by said shaft upon movement of such section in response to impact forces.

6. A bumper as claimed in claim 5 in which the recoil means of each section is mounted for movement with its section and each member carried by said shaft is arranged to engage the actuating member of the associated recoil means and the associated abutment member.

7. A bumper as claimed in claim 5 in which said two abutment members of each section are arranged to engage their respective actuating member and shaft carried member substantially simultaneously.

8. A bumper as claimed in claim 1 in which each said recoil means comprises a ring spring assembly mounted at the end of a bumper section remote from the impact receiving end thereof.

9. A bumper as claimed in claim 1 in which each said shock absorbing means comprises a hydraulic shock absorber of dash-pot type with a restoring spring assembly.

10. A bumper for absorbing the force caused by an engaging workpiece comprising a plurality of discrete movable bumper sections, each bumper section having an individual bumper head arranged on one side of said section and side-by-side with a bumper head of adjacent sections, the discrete bumper heads together forming a substantially continuous bumper surface in their normal position when no force is applied, individual abutment means forming part of each bumper section remotely arranged from said head thereof, individually operable shock absorbing means associated with each bumper section for initially absorbing the shock applied to its associated bumper section, and a member displaceable by said bumper sections and engageable with said abutment means so that motion imparted to one or more bumper sections upon engagement by a workpiece is transmitted by said member to said abutment means of the remaining bumper sections not engaged by the workpiece thereby to further absorb the force.

References Cited in the file of this patent

UNITED STATES PATENTS

| | | |
|---|---|---|
| 1,530,017 | Souliotis | Mar. 17, 1925 |
| 1,702,675 | Ventura | Feb. 19, 1929 |
| 1,718,875 | Ramsey | June 25, 1929 |
| 1,792,157 | Franke | Feb. 10, 1931 |
| 1,857,435 | Cole | May 10, 1932 |
| 1,860,122 | Wikander | May 24, 1932 |
| 2,516,172 | Baldwin | July 25, 1950 |
| 2,600,060 | Lopes et al. | June 10, 1952 |
| 2,628,118 | Gunnels | Feb. 10, 1953 |

FOREIGN PATENTS

| | | |
|---|---|---|
| 493,911 | Belgium | Feb. 28, 1950 |